Figure 4:
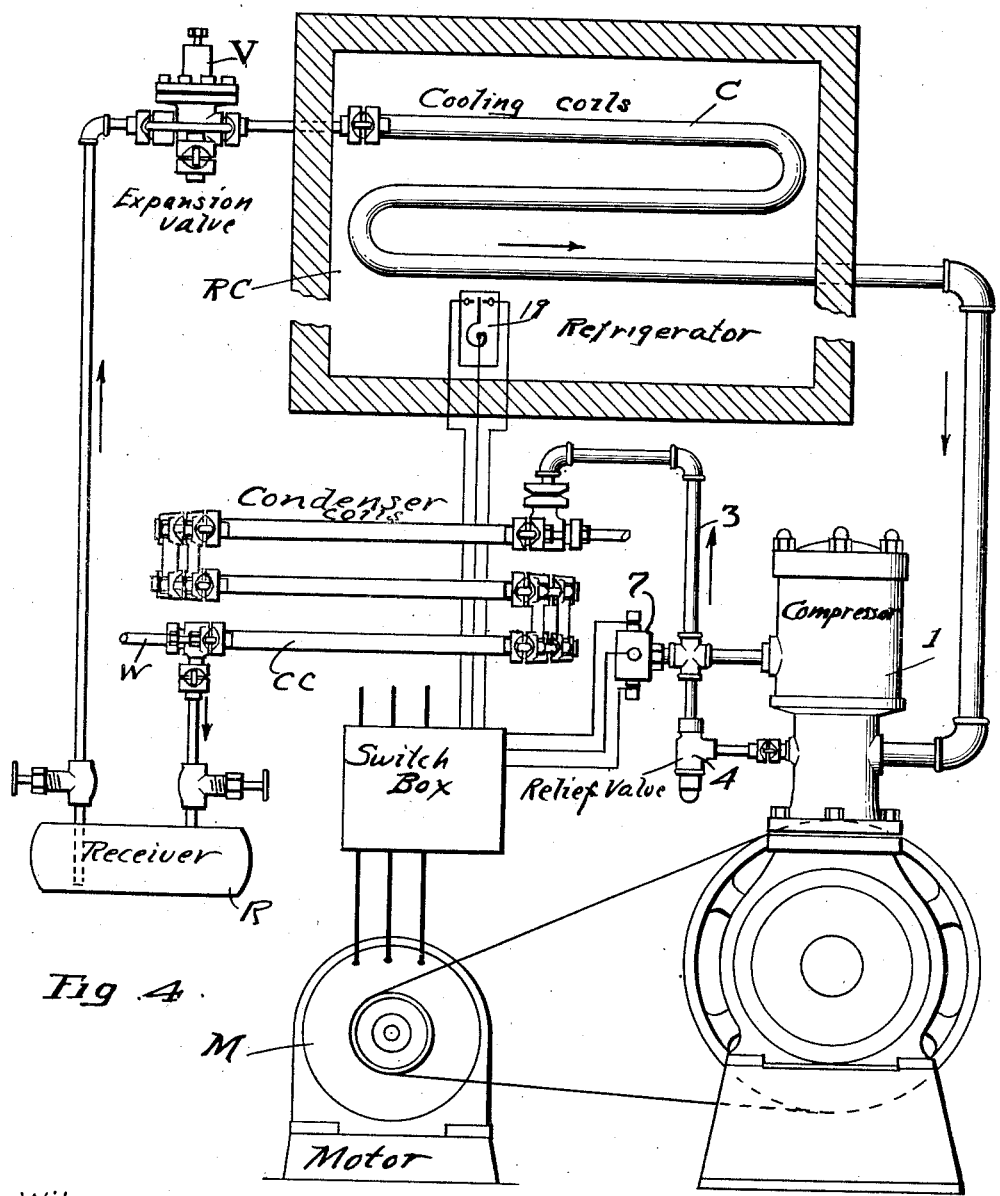

Sept. 1, 1925.  
B. C. SHIPMAN  
AUTOMATICALLY CONTROLLED REFRIGERATING APPARATUS  
Filed July 8, 1920  
1,552,239  
2 Sheets-Sheet 1
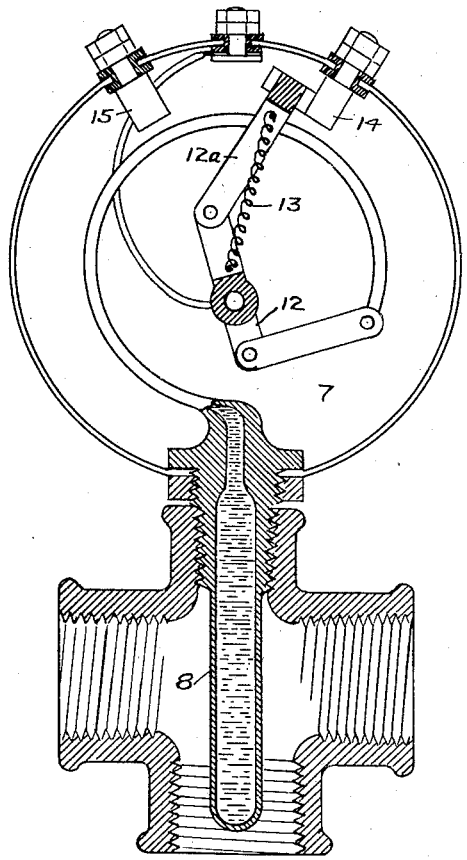
Fig 2
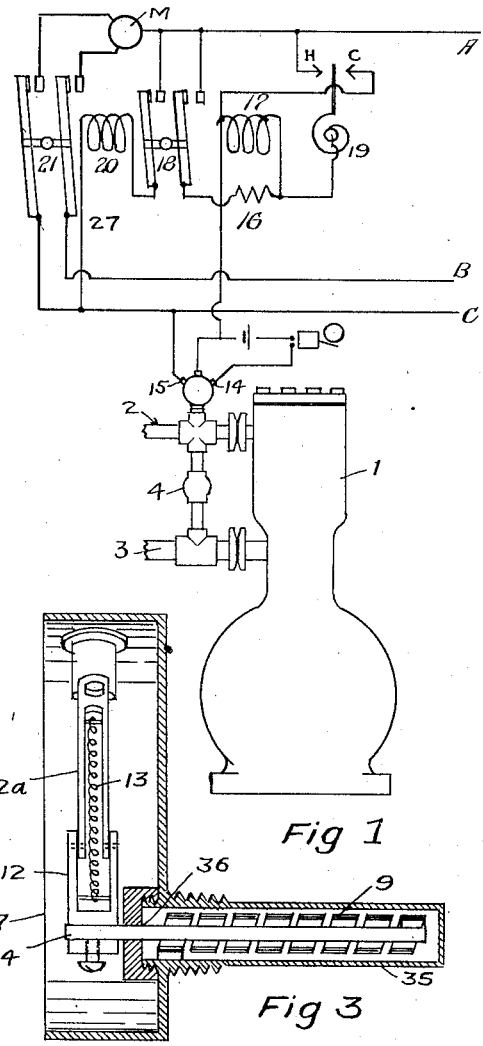
Fig 1
Fig 3
Witnesses
R. Ramsay
R. L. Young
Inventor
Bennet Carroll Shipman Patented Sept. 1, 1925.

1,552,239

UNITED STATES PATENT OFFICE.

BENNET CARROLL SHIPMAN, OF SAN FRANCISCO, CALIFORNIA.

AUTOMATICALLY-CONTROLLED REFRIGERATING APPARATUS.

Application filed July 8, 1920. Serial No. 394,695.

*To all whom it may concern:*

Be it known that I, BENNET CARROLL SHIPMAN, a citizen of the United States, residing at San Francisco, in the county of San Francisco and State of California, have invented certain new and useful Improvements in Automatically-Controlled Refrigerating Apparatus, of which the following is a specification.

It is a well-known difficulty in the operation of such machines without attendants that a failure of the water supply or other causes of high pressure will result in disastrous consequences, and various devices have been proposed and used to overcome this danger. The object of my invention is to provide for a combined interacting control responsive to temperature changes in the refrigerated spaces, to excessive pressures in the discharge or high pressure side of the system, and to excessive temperatures in the discharge of the compressor, so that under normal conditions the plant will be controlled by the refrigerated temperatures and under abnormal conditions by the temperature and pressure of the discharge gas.

Fig. 1 is a diagrammatic plan of the arrangement. Fig. 2 is a more detailed view of one type of thermostat adapted to my invention, and Fig. 3 is a more detailed view of another type of thermostat. Fig. 4 is a diagrammatic view of a refrigeration system such as is described herein equipped with thermostatic controls, the subject matter of this invention. Describing the invention in detail and referring to the various figures, where similar numerals designate similar parts, it is well known that gas undergoing compression heats, and for any given case under normal conditions, there will be a normal temperature in the discharged gas. In case the discharge pressure is forced up above its normal pressure, its temperature rises. In Fig. 1, 1 may represent any suitable type of compressor; 2, the discharge connection; 3, the suction connection. The remainder of a refrigerating plant and system need not differ materially from standard practice.

The compressor 1 is driven by a suitable motor M, controlled by the electrical switch 27 which is installed within the switch box illustrated. The delivery pipe 3 from the compressor extends to the conventional condenser coils C—C which, in the present instance, are cooled by means of an interior water pipe W. From the condenser coils, the liquid ammonia is delivered to the receiver R, from which it passes to the expansion valve V, and passes thence into the coils within the refrigeration compartment RC. The cooling coils are indicated at C, and the gas passes back to the compressor 1.

The thermostat 19 is installed within the refrigeration compartment, while the thermostat 7 is installed so that it will operate in accordance with the heat developed in the discharge from the compressor. In order to prevent excessive pressure from accumulating within the condenser coils under conditions of wet compression, the relief valve 4 is installed below the pipe 3, to by-pass the compressor.

Between the discharge connection, 2, and the connection, 3, is installed a suitable relief valve, 4, normally closed but adjusted to open at any predetermined pressure. In the discharge, 2, there is installed a thermostatic element, 8, adapted to respond to the temperature of the fluid surrounding it, and to register such response on a suitable mechanism, 7. In Fig. 1, and also Fig. 2, this mechanism is illustrated as a Bourdon tube, adapted to respond to the expansion of a fluid, such as mercury, contained in it and in the element, 8, projecting into the discharge connection 2.

This Bourdon tube, as illustrated in Fig. 2, is arranged to operate a simple single pole switch, consisting of a bifurcated arm, 12, connected by a link to the Bourdon tube, carrying another bifurcated arm, 12ª, pivoted at its inner end (both of which are shown in another view in Fig. 3), which arm, 12ª, carries at its outer end suitable contacts to engage with the contacts, 14 and 15. The arm, 12ª, is controllably attached to the arm, 12, by means of a spring, 13, attached to both arms, and riding centrally. With this construction it is evident that a movement of the arm, 12, say in a clockwise direction, will result first in bringing the two arms in exact line, and then with the least movement past exact alignment in causing the arm, 12ª, to suddenly be thrown to the left against contact, 15, thus making a quick break switch, and by suitable connections to the controlling circuits, effecting the cessation of the cause of its action. By making the position of contacts, 14 and 15, adjustable (not so shown in the figure), it is evident that various ranges of operation can be secured. Also if desired, a control spring could be added to the Bourdon tube to secure adjustability by varying its tension.

It is to be observed from Fig. 1 that the control circuit is interconnected with the thermostat of the refrigerated spaces and the thermostat of the discharge gas. With the thermostat, 7, in its operative position the operation of the plant is under control of the thermostat, 19, located in the space to be refrigerated. In case of high temperature in the discharge gas, however, the operation of the plant is under control of the thermostat, 7, regardless of the condition of thermostat, 19.

It sometimes happens that the refrigerant will return to the compressor in liquid or unevaporated form, and then what is termed "wet compression" will take place. In such an event, the temperature will not rise on compression if there is enough liquid in the compression space to absorb by evaporation the heat of compression. This action takes place when ammonia is used as a heat transfer agent. Consequently under such circumstances, although the pressure may be high, the temperature need not be, and under certain circumstances, such as absence of condensing water, with sufficient liquid coming over, the pressure could reach the dangerous point without the thermostat, 7, operating to shut down the driving power. For such a contingency I provide the relief valve, 4, between the discharge, 2, and suction, 3. This relief valve need not be described, as any one suitably designed for the fluid to be used, would serve. Its office is as follows: Under the conditions of wet compression above assumed, when a predetermined pressure is reached, the relief valve will allow the discharge to pass to the suction thus preventing any further rise in pressure. But this gas in passing to the suction and thence around through the compressor again will prevent any more refrigerant, and hence any more liquid, from arriving at the compressor from the expansion circuit. In a short time, therefore, the compressor instead of operating under wet compression conditions, will soon be again operating under dry compression, and, therefore, will again develop the heat due to compression. If no cooling water is flowing, this condition will repidly be reached, and hence the thermostat will respond to this temperature and shut down the plant. It will be observed, therefore, that under normal dry compression the thermostat, 7, will control the high pressure without any assistance from the relief valve, 4, but under sufficiently wet compression the relief valve, 4, will control the pressure until such time as the heat developed operates to shut down the plant. Without such control the heat developed becomes so excessive as to melt the lead gaskets in the flanges and cylinder head covers.

In Fig. 3 I illustrate another type of thermostat which may be used to greater advantage under certain circumstances. It consists of a strip of two dissimilar metals wound into a helix, 9, and securely fastened together. This helix may be inserted into a containing tube, 35, adapted to project into a pipe as in the case of element, 8. One end of the helix is fastened to the containing case and the other to the shaft, 34, which shaft passes through the bearing, 36. To this shaft is affixed the bifurcated arm, 12, and the balance of the arrangement is as described for Fig. 2. It is evident that a change of temperature will cause the thermostatic helix to coil and uncoil more or less, and therefore to cause the necessary movmeents of the arm, 12ª, etc.

The control circuits are merely indicated to make the diagram complete. Many different control arrangements can be used provided the thermostats are properly connected to give the master control to the thermostat, 7, and the auxiliary control to the thermostat, 19. Steam or gas engines with appropriate control mechanisms operated by my combination of thermostats could be substituted for the motor drive without departing from the spirit of my invention.

Having described my invention, I claim and desire to secure by Letters Patent:

1. In a refrigerating system, the combination of suitable means for compressing, condensing, circulating, expanding and evaporating a refrigerant with automatic means responsive to the temperature in the discharge circuit from the compressor for controlling compressive operations under abnormal conditions regardless of the conditions in the expansion part of the circuit.

2. In a refrigerating system, the combination of suitable means for compressing, condensing, circulating, expanding and evaporating a refrigerant with a thermostat responsive to temperature in the compressor discharge circuit for controlling compressive operations under abnormal conditions regardless of the conditions in the expansion part of the circuit.

3. In a refrigerating system, comprising a compressor, condenser, expansion coils, the combination of a means responsive to temperature in the refrigerated space for controlling the operation of the compressor, to maintain a uniformity of such refrigerated temperatures, with means responsive to temperature in the discharge of the compressor for controlling the operation of the compressor above a predetermined temperature of the refrigerant at the discharge of the compressor adapted to interrupt the control to both said means, above such predetermined temperature and to restore such control below such predetermined temperature.

4. In a refrigerating system including the usual compressor, condenser and expansion coils, the combination of a mechanism responsive to variations of temperature in the refrigerated space adapted to start or stop the operation of the compressor upon an increase or decrease respectively from a predetermined point of the temperature of such refrigerated space with a mechanism responsive to variations of temperature of the discharge fluid of the compressor adapted to make inoperative the mechanism controlled by the refrigerated temperature when the temperature of the compressor's discharge exceeds a predetermined limit, and to restore the operative conditions of the said mechanism controlled by the refrigerated temperatures when the temperature of the compressor's discharge falls below a predetermined limit.

5. In a refrigerating system including the usual compressor, condenser, expansion coils, and means for driving the compressor, the combination of electric circuits for controlling the said driving means, a thermostat responsive to changes of refrigerated temperatures adapted to connect the electric control circuit to start the compressor upon a rise of temperature above a predetermined limit in the refrigerated space and to disconnect said control circuits upon a fall of temperature below a predetermined limit in said space, and a thermostat responsive to changes in temperature in the discharge outlet of the compressor adapted to disconnect said electric control circuit when the temperature in such discharge outlet is above a predetermined limit, and to reconnect said circuit when the temperature in such discharge outlet is below a predetermined limit, with a relief valve connected between the discharge outlet and the suction inlet of said compressor.

6. In a refrigerating system comprising the usual means for compressing, condensing, expanding and evaporating a volatile liquid refrigerant, the combination of a thermostat in a space to be refrigerated adapted to start or stop the compressing means according as the temperature in said space may be above or below a predetermined point, and a thermostat in the discharge circuit of said compressing means adapted to make the action of the first mentioned thermostat ineffective when the temperature of the discharged refrigerant from the said compressive means exceeds a predetermined point, and to make said action of said first mentioned thermostat effective again, when the temperature of the discharged refrigerant from the said compressor means falls below a predetermined point, with a pressure relief valve connected between the discharge and suction sides of said compressor means.

7. In a refrigerating system comprising means for compressing, condensing and evaporating a refrigerant, the combination of a master thermostat responsive to temperature of the refrigerant in the outlet of said compressive means, a subsidiary thermostat responsive to the temperature of the space to be refrigerated and a relief valve connected between the outlet and inlet of said compressing means responsive to the difference in pressure between said outlet and inlet.

BENNET CARROLL SHIPMAN.